P. CATUCCI.
AUTOMATIC CHUCK.
APPLICATION FILED MAY 15, 1911.
1,034,419.
Patented Aug. 6, 1912.
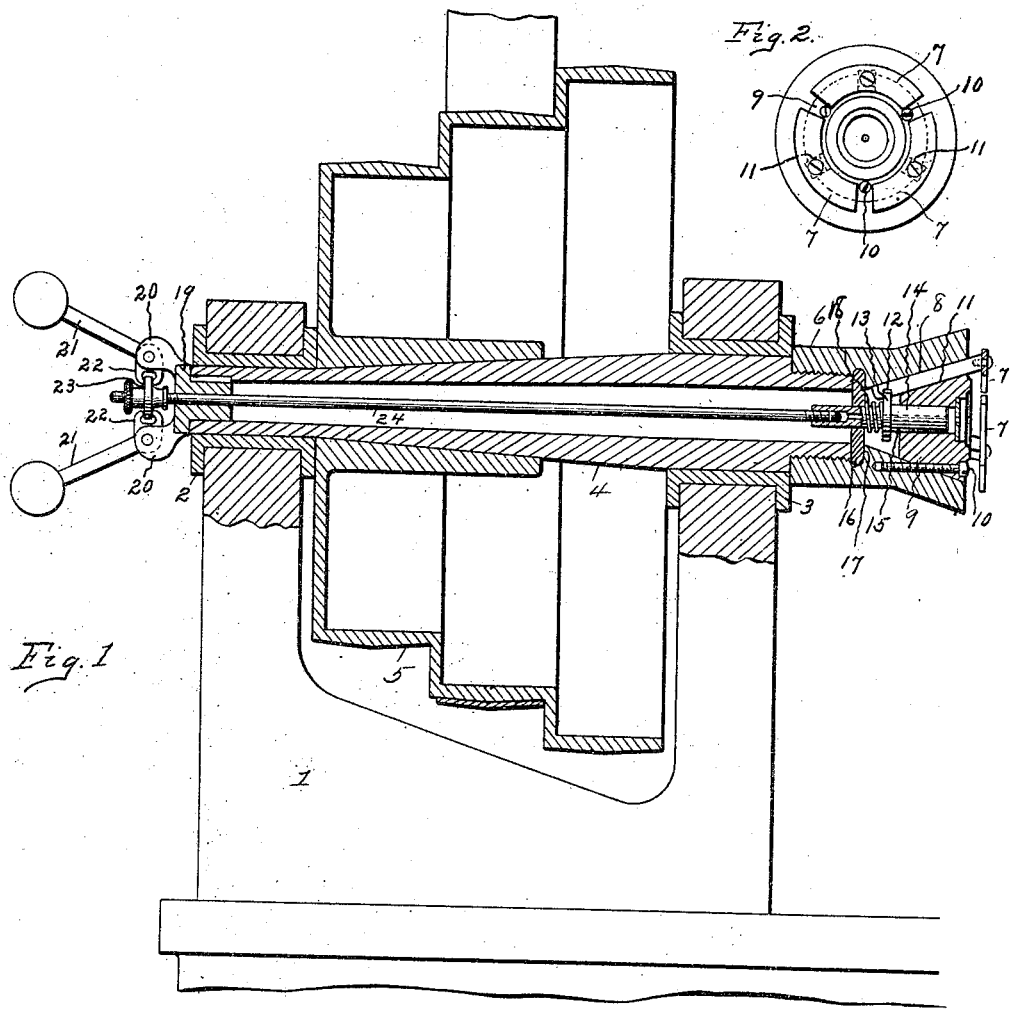
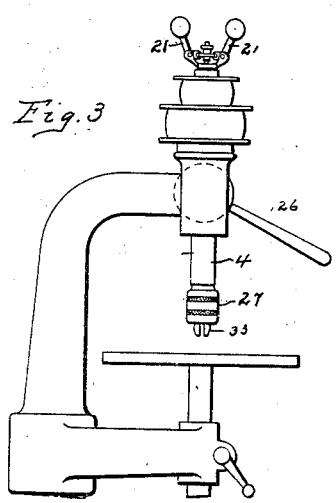
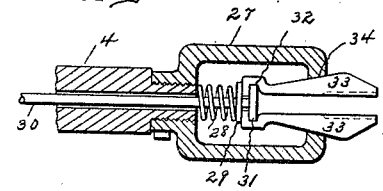
WITNESSES
H. Baldwin
J. Scott Marshall
Pliny Catucci INVENTOR
BY
Louis M. Sanders
ATTORNEYS

UNITED STATES PATENT OFFICE.

PLINY CATUCCI, OF NEWARK, NEW JERSEY, ASSIGNOR, BY MESNE ASSIGNMENTS, TO MEISSELBACH CATUCCI MANUFACTURING COMPANY, A CORPORATION OF NEW JERSEY.

AUTOMATIC CHUCK.

1,034,419.      Specification of Letters Patent.      Patented Aug. 6, 1912.

Application filed May 15, 1911. Serial No. 627,311.

*To all whom it may concern:*

Be it known that I, PLINY CATUCCI, a citizen of the United States, residing in the city of Newark, county of Essex, and State of New Jersey, have invented certain new and useful Improvements in Automatic Chucks; and I do declare the following to be a full, clear, and exact description of the same, such as will enable others skilled in the art to which it appertains to make, construct, and use the same.

The object of my invention is to provide a chuck for lathes or power drills of such a character that when running at full speed, the work piece shall be firmly held in position in the chuck, while a material reduction of speed of the rotating lathe or drill spindle will result in automatically releasing the work piece from the chuck and permit the operator to place a new work piece therein; or in case of the use of the device as an automatic drill chuck, the reduction of the speed of the drill spindle will cause an automatic release of the drill held in the chuck, and thereby permit the operator to replace such drill with another of a different size if desired.

As a lathe chuck, the device will find its fullest usefulness where a large number of work pieces are to be operated upon by the same kind of a tool and for the same purpose, such tool being normally held in the tail stock of the lathe. The principle of the structure, however, is applicable to the general use of lathe chucks and drill chucks. In the following description I have confined the same to the machines above referred to, namely; drill chucks and lathe chucks.

In the drawing accompanying this application and forming a part hereof, Figure 1. illustrates in vertical section a lathe head stock with my improved drill chuck in position. Fig. 2. illustrates a front end view of the lathe chuck proper. Fig. 3. illustrates the principle applied to a vertical drill spindle. Fig. 4. illustrates a modified form of chuck jaw.

Similar numerals refer to like parts throughout the specification and drawing.
The lathe head stock 1, is of any usual or preferred construction, provided with bearings 2, 3, in the upper parts of the vertical stanchions. The usual hollow spindle 4, is mounted in the bearings 2, 3, such spindle carrying the cone pulley 5 in any usual or preferred manner. At the forward end of the spindle 4, is located the chuck head 6, which in the present case is provided with the three diagonally disposed chuck jaws 7, which are located within the conical opening 8, of the chuck head. Within this opening 8, is a cone block 9, nicely fitted to the conical opening 8, and held in position by the screws 10. At uniform intervals around the cone block 9, are the several channels 11 to receive the shanks of the chuck jaws 7. The rear end of each of the chuck jaw shanks is provided with the notches, 12, which take over the collar 13, of the chuck spindle 14, the forward end of the latter being received into an inner aperture 15, in the cone block 9. The chuck head 6, is screwed upon the outer projecting end of the spindle 4, in the usual manner with a washer 16, located between the end of the spindle and an interior shoulder 17, of the chuck block. This washer receives the rear end of the spindle 15, which is guided thereby. Between this washer 16, and the collar 12, I locate a heavy spring 18, the tendency of which is to force the spindle 14, and with it the chuck jaws 7, outwardly, thereby separating such chuck jaws. In the opposite end of the spindle 14, I mount a thimble 19, such thimble being held in the spindle in any suitable manner, as by splining it to the spindle. This thimble 19, is provided with a pair of apertured lugs 20 in which are mounted a pair of centrifugal weighted arms, 21, such arms being provided at their inner ends with the jaw 22 which takes over an adjustable collar 23, screwed on to the end of the rod, 24, the latter passing through the thimble 19, through the hollow of the spindle 4, and secured in any convenient manner to the inner end of the chuck spindle 14, for example, by screwing the same therein.

The operation of this structure is as follows: The spring 18, is of sufficient tension, as heretofore described, to force the spindle 14, and with it the chuck jaws 7, outwardly so as to separate the same, and permit the insertion of a work piece within said jaw. The rapid rotation of the spindle 4, through a driving belt mounted upon the cone pulley 5, will cause the centrifugal weighted arms 21 to fly outwardly and thereby act upon the rod 24, to pull the chuck spindle 14 inwardly and with it the chuck jaws 7, so as to grip firmly the work piece within said jaws, and the more rapid the rotation of the spindle 4, the more firmly will the work piece be gripped within the jaws, this of course, being due to the action of the centrifugal weighted arms 21. When it is desired to remove the work piece from the chuck, it is only necessary for the operator to check the speed of the cone 5, and spindle 4, when, of course, the spring 18, will exert its force to drive the spindle 14 outwardly, thereby drawing the weighted arms 21 toward each other, and thus separate the jaws 7.

The structure of the drill spindle as illustrated in Fig. 3 is identical with that illustrated in connection with the lathe spindle in Fig. 1, with the exception that such drill spindle is vertically slidable as is well-known in tools of this character, and I do not deem it necessary to give a more specific description of the same, other than to state that the vertical sliding of the drill spindle 25, is accomplished through the medium of the lever 26.

In the form of chuck illustrated in Fig. 4, the chuck block 27, is of usual type, and secured to the end of the chuck spindle 4, in the ordinary manner, with the heavy spring 28, located between the collar 29, upon the rod 30, and the end of the spindle 4. A second collar 31 is also secured to the rod 30, at its outer end, and this collar receives the notches 32 in the rear ends of the tapered chuck jaw 33, the latter projecting without the chuck block 27, and bearing upon the tapering opening 34 in said chuck block. It will be readily seen that if this form of chuck block is substituted for the form illustrated in Fig. 1, the action of the weighted arms 21, will draw the chuck jaw 33, into the chuck block 27, and through the tapering of such chuck jaws will cause such jaws to approach each other, and thus grip firmly any tool or work piece inserted between them. As above indicated any material reduction in the rotation of the spindle 4, will permit the spring 28, to act upon the rod 30, and thus force the same outwardly and with it the jaw 33, and thereby release the tool or work piece.

I claim.

1. In an automatic chuck, the combination of a hollow rotatable spindle, a chuck head secured to one end of said spindle, chuck jaws mounted in said head, spring mechanism for separating said jaws, and centrifugal mechanism secured to the opposite end of said spindle and connected to said jaws to draw them together upon the rapid rotation of said spindle against the action of said spring mechanism.

2. In an automatic chuck, the combination of a rotatable chuck head, chuck jaws, automatic means for separating said jaws upon the checking or stopping of the rotation of said chuck head, and centrifugal mechanism for drawing said jaws toward each other to grip a work piece or tool.

3. In an automatic chuck, the combination of a chuck spindle, a chuck head mounted thereon to rotate therewith, jaws mounted in said head, automatic means for separating said jaws upon the checking or stopping of the rotation of said spindle to receive a work piece or tool, and a centrifugal device secured upon said spindle for actuating said jaws to cause them to draw together and grip a work piece or tool.

4. In an automatic chuck, the combination of a rotatable chuck spindle, a chuck head mounted thereon, chuck jaws mounted in said head, automatic spring mechanism for causing said jaws to separate to receive a work piece or tool when the rotation of said spindle is checked or stopped, a pair of centrifugal weighted arms pivotally secured to said spindle to rotate therewith, a rod connecting said jaws with said arms, whereby the centrifugal action of said arms will cause said jaws to draw together and grip a work piece or tool there between.

5. In an automatic chuck, the combination of a hollow spindle, a chuck head secured to one end of said spindle, diagonally disposed, slidable jaws mounted in said head, automatic spring mechanism within said head for separating said jaws when the rotation of said spindle is checked or stopped, a pair of weighted centrifugal arms pivotally secured to the opposite end of said spindle, a rod extending through said spindle and connecting said jaws with said arms, whereby the rapid rotation of said arms will draw said jaws toward each other.

6. In an automatic chuck, the combination of a hollow spindle, a chuck head secured to one end of said spindle diagonally disposed, slidable jaws mounted in said head, spring mechanism within said head for separating said jaws, a pair of weighted centrifugal arms pivotally secured to the opposite end of said spindle, a rod extending through said spindle and connected at one end with said jaws, and adjustably connected at its other end with said arms, whereby the rapid rotation of said spindle and arms will draw said jaws toward each other and the checking or stopping of such rotation will separate said jaws.

PLINY CATUCCI.

Witnesses:
NORMAN E. ZUSI,
LOUIS M. SANDERS.